Figure 1:
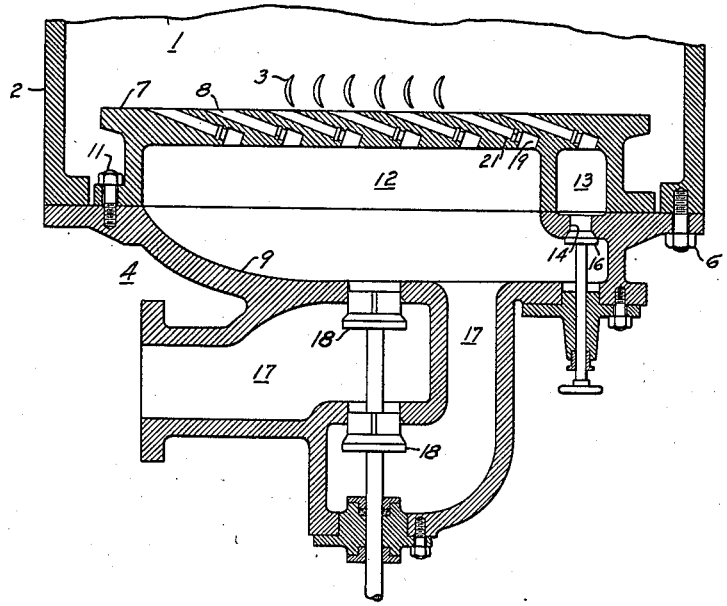

May 12, 1942. J. L. RAY 2,283,126

TURBINE NOZZLE

Filed Aug. 18, 1939

Inventor
J. L. Ray
by G. W. Kelbrin
Attorney

Patented May 12, 1942

2,283,126

UNITED STATES PATENT OFFICE 2,283,126

TURBINE NOZZLE

James L. Ray, Elm Grove, Wis., assignor to Allis-Chalmers Manufacturing Company, Milwaukee, Wis., a corporation of Delaware Application August 18, 1939, Serial No. 290,767

4 Claims. (Cl. 253—78)

This invention relates to turbine nozzles and more particularly to the manner of removably securing nozzle liners in a turbine diaphragm, wall or nozzle block.

Satisfactory materials for constructing nozzle passages must be highly resistant to the erosive and corrosive action of the driving fluid and must possess considerable tensile strength under the high temperature conditions generally prevailing. Materials having these properties are relatively expensive and in order to reduce costs, the actual nozzle passage defining means is generally constructed from materials different than those from which the diaphragm, wall or nozzle block is constructed. The usual practice is to form the nozzle passages by boring holes in the diaphragm, wall or nozzle block and by inserting and securing in each hole a tubular liner defining a nozzle passage. However, an entirely satisfactory means for removably securing the liners in the holes in the diaphragm, wall or nozzle block has not heretofore been developed.

A pressed or shrunk fit does not provide an effective securing means due to the effect of creep and to the fact that the coefficient of expansion of the liner material is generally different than that from which the diaphragm, wall or nozzle block is constructed. As a result, the liners soon become loose and in some instances are deformed sufficiently to materially decrease the nozzle efficiency. A threaded engagement between the liner and the diaphragm, wall or nozzle block is also defective as a securing means for the reasons stated with respect to a pressed or shrunk fit. The use of set screws and locking pins as additional securing means has not proved feasible because, as soon as the liner becomes loose in the bore due to creep and/or the unequal expansion previously mentioned, that portion of the liner in the region of the set screw or locking pin is subjected to extremely high stresses which in some instances has caused the liners to fail. Moreover, the force tending to move the liner in the direction of fluid flow is sufficient under the high temperature and pressure conditions prevailing in modern turbines to shear the retaining pin or set screw. Obviously, this condition is aggravated by the liner becoming loose in the bore and by the relative movement of the liner in response to the application of the driving fluid.

A means commonly employed to secure the liners in the holes in the diaphragm, wall or nozzle block is to counterbore the inlet ends of the holes and to use liners having an annular enlargement adjacent its inlet end adapted to fit within the counterbored portion and prevent movement of the liner in the direction of fluid flow. The liners are generally pressed into place which necessitates the use of entering holes or an extremely large entrance recess. Another securing means which is also commonly employed is to reduce the diameter of the inlet portion of the bore and of the liner to thereby provide abutting surfaces intermediate the ends of the liner and bore. The reduced inlet end of the liner usually extends beyond the bore and may be externally threaded to receive a nut or other means for clamping the liner in position. This arrangement also necessitates the use of entering holes or a large entrance recess which greatly increases the cost of manufacture and in addition prevents the formation of a nozzle passage having an efficient inlet portion.

It is therefore an object of this invention to provide a novel nozzle construction for turbines in which accurately preformed nozzle liners may be inserted and removed without the use of entering holes.

Another object of this invention is to provide a new and improved nozzle construction for turbines in which nozzle liners dimensioned to be coextensive with the nozzle bores may be inserted from the discharge end of the bores and accurately positioned and securely held against axial movement by a means uniformly coacting with a circumferential portion of the liner intermediate its ends.

Figure 2:
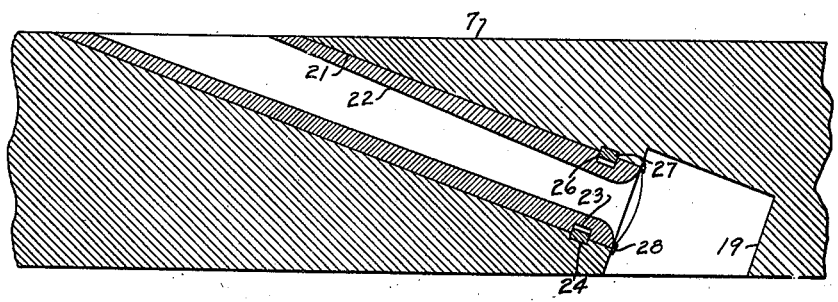

The invention accordingly consists of features of construction, combinations of elements and arrangements of parts as more fully pointed out in the appended claims and in the detailed description, in which:

Fig. 1 is a developed sectional view of a nozzle box embodying the invention; and Fig. 2 is an enlarged sectional view illustrating in detail a single nozzle structure.

Referring to the drawing, and more particularly to Fig. 1, the invention is shown as applied to a portion of a turbine 1 having a casing 2, a row of moving blades 3 and a nozzle box 4 which is removably attached to the casing 2 by any suitable means such as the cap screws 6. For simplicity of illustration only a portion of the turbine and of the moving blade row 3 is shown. The nozzle box 4 comprises a nozzle block 7 having a plurality of nozzle passages 8 therein and a cover member 9 which is shown as detachably secured to the nozzle block 7 by means of cap screws 11 and which coacts with the nozzle block 4 to form therewith a main nozzle chamber 12 and an auxiliary nozzle chamber 13. However, the preferred construction is to weld the cover member to the nozzle block to form an inseparable nozzle box structure. The main and auxiliary nozzle chambers communicate by means of a passage 14 which is controlled by a valve 16. In the arrangement shown only one of the nozzle passages 8 communicates with the auxiliary nozzle chamber 13. The cover member 9 is provided with an inlet passage 17 for conducting motive fluid from a suitable source (not shown) to the main chamber 12 and this passage is in turn controlled by a valve 18 which may be actuated in any desired manner to regulate the flow of the motive fluid into the main nozzle chamber. The expanding nozzle passages 8 are shown as operatively arranged in a conventional manner with respect to the row of moving blades 3 and in this connection it is believed that further details with respect to the general construction and arrangement of parts is unnecessary for a complete understanding of the invention.

The expanding nozzle passages 8, each comprises an enlarged entrance recess 19, a cylindrical bore 21 communicating at one end with the recess 19 and with its other end terminating in the face of the nozzle block 7 in proximity to the moving blade row 3 and a liner 22 disposed within the bore 21. The liner 22 is dimensioned to be coextensive with the bore and contiguous portions of the bore and liner are provided with circumferentially extending recesses 23 and 24, respectively, which coact when the liner is properly positioned within said bore to provide, in effect, continuous retaining surfaces 26. A resilient split ring member 27 of slightly less radial thickness than the depth of the groove in the liner 22 and of a diameter when not compressed slightly greater than that of the bore 21 is positioned about the liner 22 in concentric relation with respect to the retaining groove 23 and compressed so that the outside diameter of the ring 27 is slightly less than that of the liner 21. With the liner and ring assembled in this relation, the liner is then pressed into the bore 21 until the ring 27 is opposite the groove 24 in the bore 21 which permits the ring 27 to expand and correctly position the liner 22 within the bore 21. The edges of the split ring 27 coact with the continuous retaining surfaces 26 formed by the retaining grooves or recesses 23 and 24 to prevent axial movement of the liner with respect to the bore. If desired, a tack or spot weld 28 may be made at the inlet end of the liner to prevent a rotation of the liner within the bore in the event the effect of expansion and/or creep should produce some looseness between the liner and bore. However, this feature has not been necessary and may be omitted.

The entrance recess 19 is preferably formed in the block 7 by a milling operation although any suitable means including casting may be employed. The bores 21 may be made by either drilling or boring and the recesses 24 can be readily turned by means of an inside grooving cutter. The proper dimensions for the bore and liner can be readily determined by any one skilled in the art to obtain the desired degree of pressure velocity conversion. Obviously the dimensions of the coacting recesses 23 and 24 and of the ring 27 must be such as to provide a sufficient retaining surface to prevent an axial movement of the liner with respect to the bore by the action of the motive fluid. The values determining the requisite dimensions for the recesses and the coacting ring member can also be readily calculated by any one skilled in the art. However, in most instances satisfactory results will be obtained in structures in which the nozzle bores are approximately 0.75 inch in diameter if the depth of the recesses 23 and 24 is made about 0.035 and 0.015 inch respectively and if the ring 27 be made about 0.030 inch thick and about 0.0625 inch wide. The width of the grooves 23 and 24 should be slightly greater than the width of the ring 27. Any one skilled in the art can readily make these liners from cold drawn stock, either plain or stainless steel, by means of an ordinary screw machine and at a minimum cost.

The outside diameter of the liner 22 is preferably made about 0.001 of an inch more than the diameter of the bore 21 and in order to insert the liner and ring assembly in the bore 21 as previously described it is necessary to shrink this assembly which can be readily accomplished by packing the said assembly in solid $CO_2$. The liner 22 can be readily removed by inserting a suitable pulling tool and exerting an axial force capable of shearing the retaining ring 27 or if desired an internal cutting tool may be first inserted and a groove turned which merges with the recess 23. The portion of the liner remaining between the retaining groove and the entrance recess can then be driven from the bore into said recess and removed through the nozzle box.

This construction not only provides a means by which a liner may be inserted from the discharge end of a nozzle bore and correctly positioned both with respect to the bore and the entrance recess, but it also permits the fluid passage defined by the liner to be completely and accurately preformed to provide the most efficient inlet and passage configuration prior to the insertion of the liner within the bore. Consequently, no hand finishing is required to improve the inlet configuration after the liner has been positioned within the bore which is a costly procedure that is generally necessary in connection with the types of liner assemblies now generally in use.

The invention is obviously applicable to all types of turbine nozzle structures and although it is particularly important with respect to those turbines in which the dimensions of the nozzle block diaphragm and the like are such as to prevent the use of large entrance recesses on entrance bores to permit the insertion of the liner from the inlet end of the nozzle bore, it should be understood that it is not desired to limit the invention to the exact details and features of construction herein shown and described as various modifications within the scope of the claims may occur to persons skilled in the art.

It is claimed and desired to secure by Letters Patent:

1. A nozzle structure for elastic fluid turbines including means defining a nozzle chamber having a passage adapted to conduct working fluid from said chamber to a row of moving blades, said passage being of greater axial length than the distance between the chamber end of said passage and the opposed wall of said chamber and said opposed wall being devoid of any opening which would permit a nozzle passage liner having a greater axial length than the distance between the chamber end of said passage and the said opposed wall from being inserted into the said nozzle passage from the chamber end thereof, a nozzle passage liner of greater axial length than the distance between the chamber end of said passage and the said opposed wall thereby necessitating the insertion of said liner into the said passage from the discharge end thereof, said liner having a preformed rounded inlet portion adapted to terminate substantially flush with the inner surface of said nozzle chamber when said liner is correctly positioned within said passage, and means operating to correctly position and maintain said liner within said passage comprising a groove formed in contiguous portions of said passage and liner to extend transversely with respect to the longitudinal axis of said passage, and a compressible resilient member disposed within said groove.

2. A nozzle structure for elastic fluid turbines including means defining a nozzle chamber having a passage adapted to conduct working fluid from said chamber to a row of moving blades, said passage being of greater axial length than the distance between the chamber end of said passage and the opposed wall of said chamber and said opposed wall being devoid of any opening which would permit a nozzle passage liner having a greater axial length than the distance between the chamber end of said passage and the said opposed wall from being inserted into the said nozzle passage from the chamber end thereof, a nozzle passage liner dimensioned to be coextensive with said passage thereby necessitating the insertion of said liner into the said passage from the discharge end thereof, said liner having a preformed rounded inlet portion adapted to terminate substantially flush with the inner surface of said nozzle chamber when said liner is correctly positioned within said passage, and means operating to correctly position and maintain said liner within said passage comprising a groove formed in contiguous portions of said passage and liner to extend transversely with respect to the longitudinal axis of said passage, and a compressible resilient member disposed within said groove.

3. A nozzle structure for elastic fluid turbines including means defining a nozzle chamber having a passage adapted to conduct working fluid from said chamber to a row of moving blades, said passage being of greater axial length than the distance between the chamber end of said passage and the opposed wall of said chamber and said opposed wall being devoid of any opening which would permit a nozzle passage liner having a greater axial length than the distance between the chamber end of said passage and the said opposed wall from being inserted into the said nozzle passage from the chamber end thereof, a nozzle passage liner of greater axial length than the distance between the chamber end of said passage and the said opposed wall thereby necessitating the insertion of said liner into the said passage from the discharge end thereof, said liner having a preformed rounded inlet portion adapted to terminate substantially flush with the inner surface of said nozzle chamber when said liner is correctly positioned within said passage, and means operating to correctly position and maintain said liner within said passage comprising a groove of rectangular cross section formed in contiguous portions of said passage and liner to extend transversely with respect to the longitudinal axis of said passage, and a compressible resilient member of rectangular cross section disposed within said groove.

4. A nozzle structure for elastic fluid turbines including means defining a nozzle chamber having a passage adapted to conduct working fluid from said chamber to a row of moving blades, said passage being of greater axial length than the distance between the chamber end of said passage and the opposed wall of said chamber and said opposed wall being devoid of any opening which would permit a nozzle passage liner having a greater axial length than the distance between the chamber end of said passage and the said opposed wall from being inserted into the said nozzle passage from the chamber end thereof, a nozzle passage liner dimensioned to be coextensive with said passage thereby necessitating the insertion of said liner into the said passage from the discharge end thereof, said liner having a preformed rounded inlet portion adapted to terminate substantially flush with the inner surface of said nozzle chamber when said liner is correctly positioned within said passage, and means operating to correctly position and maintain said liner within said passage comprising a groove of rectangular cross section formed in contiguous portions of said passage and liner to extend transversely with respect to the longitudinal axis of said passage, and a compressible resilient member of rectangular cross section disposed within said groove.

JAMES L. RAY.